United States Patent [19]

Hentschel et al.

[11] 4,337,234
[45] Jun. 29, 1982

[54] METHOD FOR PREPARING SODIUM BICARBONATE AND HYDROGEN CHLORIDE

[75] Inventors: Bernhard Hentschel; Jürgen Ziebarth, both of Marl; Alfred Coenen, Maria Laach; Kurt Kosswig, Marl; Ferdinand von Praun, Haltern, all of Fed. Rep. of Germany

[73] Assignee: Chemische Werke Hüls AG, Marl, Fed. Rep. of Germany

[21] Appl. No.: 193,591

[22] Filed: Oct. 3, 1980

[30] Foreign Application Priority Data

Oct. 6, 1979 [DE] Fed. Rep. of Germany ....... 2940628
Aug. 19, 1980 [DE] Fed. Rep. of Germany ....... 3031213

[51] Int. Cl.³ ............................ C01D 7/10; C01B 7/08
[52] U.S. Cl. ..................................... 423/424; 423/481; 423/488
[58] Field of Search ................. 423/422, 424, 481, 488

[56] References Cited

U.S. PATENT DOCUMENTS 4,115,530  9/1978  Coenen ............................... 423/488
4,230,681  10/1980  Coenen ............................... 423/488

OTHER PUBLICATIONS

Translation of Israeli Patent 33,552 to Blumberg et al., (1969).

Blumberg et al. in *Proceedings I.S.E.C. 1974*, Soc. Chem. Ind., London, (1974), vol. 3, pp. 2789-2802.

*Primary Examiner*—Brian E. Hearn
*Attorney, Agent, or Firm*—Wells & Wells

[57] ABSTRACT

A process for preparing sodium bicarbonate and hydrogen chloride by reacting an aqueous sodium chloride solution with carbon dioxide under pressure in the presence of an amine and of an organic solvent.

1. Carbon dioxide is introduced under a pressure of 5-80 bars into a mixture essentially containing
   1.1 an aqueous sodium chloride solution,
   1.2 a tertiary amine,
   1.3 a non-polar, organic solvent, and
   1.4 a polar, organic solvent having a boiling point above 140° C.,
2. the aqueous and organic phases obtained are separated under the same pressure as step 1,
3. the aqueous phase is rid of the precipitated sodium bicarbonate and following reconcentration with sodium chloride is fed back into process stage 1 (carbonization),
4. the organic phase(s) containing the polar and non-polar organic solvents is (are) heated and the hydrogen chloride released is evacuated, and
5. the tertiary amine, polar and non-polar organic solvents from step 4 are recirculated to step 1.

18 Claims, 1 Drawing Figure

STAGE 1, CARBONIZATION
   $1_1$ REACTOR
   $1_2$ PRESSURIZED $CO_2$

STAGE 2, SEPARATION
   $2_1$ SEPARATION
   $2_2$ BUFFER VESSEL

STAGE 3
   $3_1$ FILTERING OF $NaHCO_3$
   $3_2$ CONCENTRATING WITH NaCL

STAGE 4, THERMOLYSIS
   $4_1$ COLUMN
   $4_2$ POSSIBLY AQUEOUS HCL
   $4_3$ GASEOUS HCL
   $4_4$ REMOVING OF IMPURITIES

STAGE 1, CARBONIZATION
$1_1$ REACTOR
$1_2$ PRESSURIZED $CO_2$
STAGE 2, SEPARATION
$2_1$ SEPARATION
$2_2$ BUFFER VESSEL
STAGE 3
$3_1$ FILTERING OF $NaHCO_3$
$3_2$ CONCENTRATING WITH $NaCl$
STAGE 4, THERMOLYSIS
$4_1$ COLUMN
$4_2$ POSSIBLY AQUEOUS $HCl$
$4_3$ GASEOUS $HCl$
$4_4$ REMOVING OF IMPURITIES
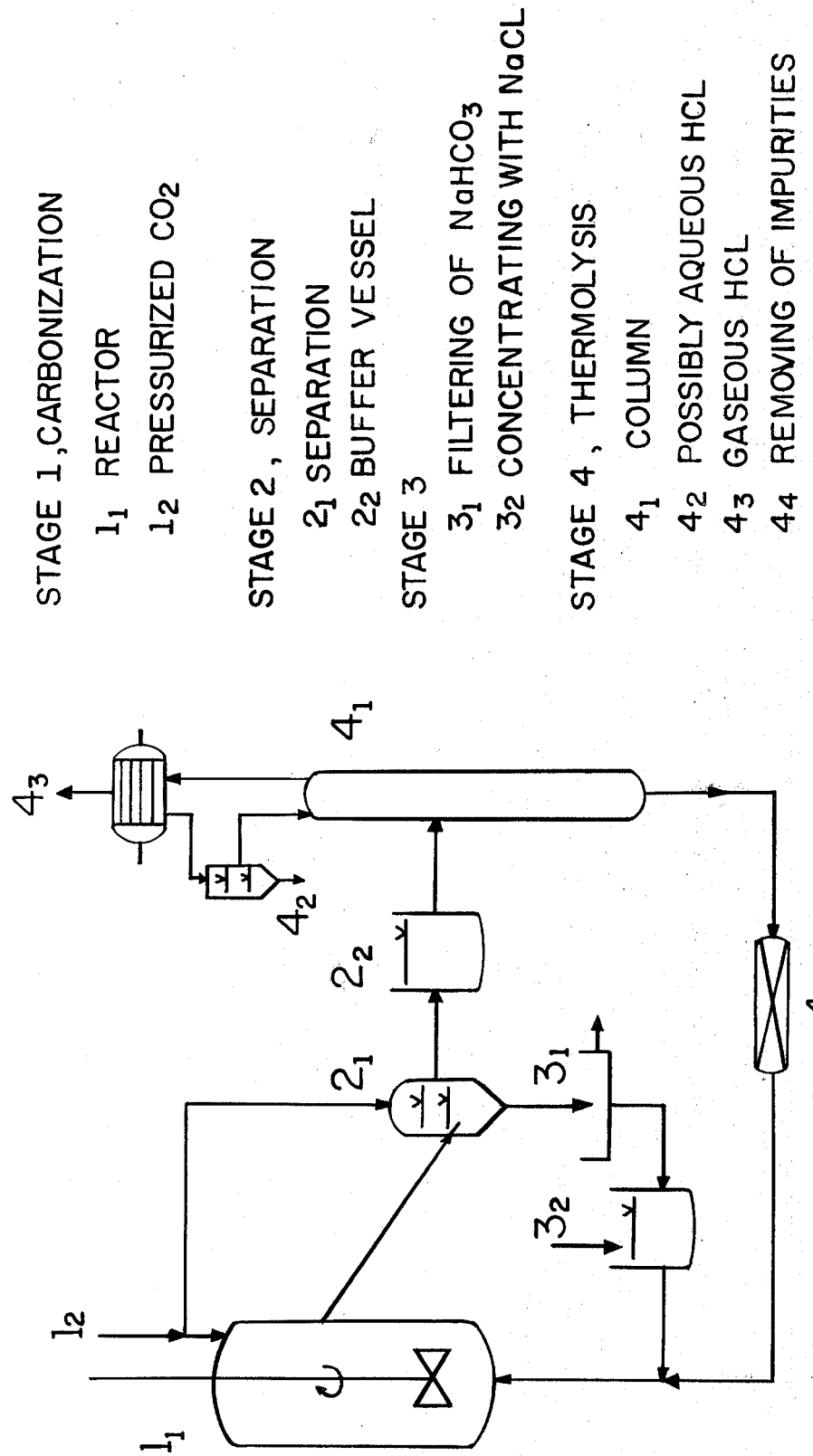

METHOD FOR PREPARING SODIUM BICARBONATE AND HYDROGEN CHLORIDE

CROSS REFERENCES TO RELATED APPLICATIONS

Applicants claim priority under 35 U.S.C. 119 for application No. P29 40 628.8 filed Oct. 6, 1979 in the Patent Office of the Federal Republic of Germany, and application No. P 30 31 312.1, filed Aug. 19, 1980.

BACKGROUND OF THE INVENTION

The field of the invention is sodium bicarbonate production and the present invention is particularly concerned with the preparation of sodium bicarbonate and hydrogen chloride by reacting an aqueous sodium chloride solution with carbon dioxide under pressure in the presence of an amine and an organic solvent.

The state-of-the-art of sodium bicarbonate production may be ascertained by reference to Israeli Pat. No. 33,552, U.S. Pat. No. 3,443,889 and the Kirk-Othmer, "Encyclopedia of Chemical Technology", Second Edition, Vol. 1 (1963), page 734 and Vol. 18 (1969), page 467, the disclosures of which are incorporated herein.

Assignee's U.S. Pat. No. 4,115,530 is incorporated herein to amplify one of the process steps used in the present invention.

A major part of the world sodium carbonate production takes place by calcining sodium bicarbonate in the Solvay process as the by-product given by the following formula:

$$NaCl + CO_2 + H_2O + NH_3 \rightarrow NaHCO_3 + NH_4Cl$$

The ammonia is recovered from the ammonium chloride usually by treatment with burnt lime according to the equation:

$$2\ NH_4Cl + CaO \rightarrow 2\ NH_3 + CaCl_3 + H_2O$$

Large amounts of calcium chloride accumulate in the process, which together with the untreated sodium chloride are discharged as waste into the sewer system. The drawback of the Solvay process therefore in essence is that all of the chlorine of the converted sodium chloride is lost in the form of worthless calcium chloride, and furthermore the reacted sodium chloride is lost.

Again, in a way similar to the Solvay process, the chlorine which is used in the method of U.S. Pat. No. 3,443,889 is lost. U.S. Pat. No. 3,443,889 includes the procedure of preparing alkali carbonates from alkali chlorides and carboxylic acid in the presence of a strongly basic amine dissolved in an organic solvent. Only the amine is extracted from the particular aminohydrochloride formed, by treating the organic phase with an alkalinically active reagent for the purpose of feedback into the process.

It is known from Israeli Pat. No. 33 552 to prepare sodium bicarbonate and hydrogen chloride in a variation of the Solvay process where first a heterogeneous mixture of an amine dissolved in a polar organic solvent and a sodium chloride brine is treated with carbon dioxide under pressures up to 9 atmospheres, in the gaseous phase. The sodium bicarbonate is precipitated from the aqueous solution, the aminohydrochloride produced remains dissolved in the organic phase and is separated. Thereupon the amine is regenerated out of its hydrochloride by treatment with aqueous magnesium hydroxide and the aqueous magnesium chloride obtained is decomposed at temperatures up to about 500° C. with the formation of magnesium oxide, magnesium oxichloride and hydrogen chloride. However, the hydrogen chloride produced is not necessarily water-free, depending on the process conditions so that it can be used commercially only in a restricted manner. This method suffers from another drawback due to the temperatures required for the production of hydrogen chloride and the related increased danger of corrosion and furthermore the additional use of magnesium salts.

SUMMARY OF THE INVENTION

Having in mind the limitations of the prior art it is an object of the present invention to develop an economical and ecology-compatible process for the preparation of sodium bicarbonate and hydrogen chloride from sodium chloride and carbonic acid.

Another particular object of the present invention to produce the hydrogen chloride under milder and industrially simpler conditions than are possible according to Israeli Pat. No. 33 552.

Still another object of the present invention is to obtain the product in water free form.

These objects are achieved according to the present invention by reacting an aqueous sodium chloride solution with carbon dioxide under pressure in the presence of both an amine and an organic solvent, wherein:

1. pressurized carbon dioxide is introduced into a mixture essentially containing
   1.1 an aqueous sodium chloride solution,
   1.2 a tertiary amine, and
   1.3 a no-polar solvent,
2. the aqueous and organic phases obtained are separated,
3. the aqueous phase is rid of the precipitated sodium bicarbonate and following reconcentration with sodium chloride is fed back into the process stage 1 (carbonization), and
4. the organic phase(s) is (are) heated and the hydrogen chloride released is evacuated.

BRIEF DESCRIPTION OF THE DRAWING

The FIGURE of the drawing is a flow sheet illustrating the present invention.

DESCRIPTION OF THE PREFERRED EMBODIMENTS

The starting point in process stage 1, which hereafter also is termed the carbonization stage, is a mixture consisting essentially of an aqueous solution of sodium chloride, an amine and a non-polar organic solvent. Further ingredients for instance may include particular amounts of dissolved and undissolved sodium bicarbonate, undissolved sodium chloride and active as well as inactive amine decay products.

The amines used whether singly or as mixtures are those having such basicity that they form hydrochlorides in the carbonization stage and also split off hydrogen chloride at a sufficiently high rate in the thermolysis stage (process stage 4), excessive temperatures (greater than 300° C.) being inadmissible as amine dissociation must be prevented. It is found that these definitions are met on the one hand by tertiary, non-aromatic amines containing from 14 to 39, preferably 18 to 36 C atoms in the sum of ligands. Furthermore, all side chains may be unbranched primary chains, however, only one methyl group at most, is present, or the unbranched primary side chains may be replaced in part or in whole by branched primary chains, provided that the branching point is removed by at least 3 C atoms from the central nitrogen atom. Further, two of the side chains may be branched, primary, with the branching in the 2-position and the third side chain is primary, unbranched, or one side chain is branched, primary, with the branching in the 2-position while the other side chains are either both unbranched, primary or only one is unbranched, primary and the others are unbranched, secondary or alicyclic. Two of the unbranched, primary side chains may be replaced by cyclohexyl groups. On the other hand, mixtures of other tertiary non-aromatic amines having 14 to 39 C atoms are useful wherein the above defined amines are predominant by weight.

Suitable amines for instance are: tri-n-hexylamine, tri-n-octylamine, tri-n-laurylamine, tri-(3,5,5-trimethylhexyl)-amine, tri-(3,5,5-trimethyloctyl)-amine, tri-(3,5,5-trimethyldecyl)-amine, N-octyl-di-(2-ethylhexyl)-amine, N,N-dioctyl-2-(-ethylhexyl)-amine, N-octyl-N-(4-heptyl)-2-ethylhexyl)-amine, N-octyl-N-(4-heptyl)-cyclohexylamine, N-octyl-N-(2-ethylhexyl)-cyclohexylamine, N-octyl-dicyclohexylamine and N-hexadecyldicyclohexylamine.

In a further development of the present invention, it is found that N-alkyl-azacycloalkanes having a total of at least 14 C atoms are useful as the tertiary amines. The general formula for such amines is

where n is an integer from 4 to 12, R is an alkyl group with a maximum of 18 C atoms and where the methylene groups may be substituted by alkyl groups with a maximum of 6 C atoms in the total sum of the alkyl groups.

Suitable N-alkyl-azacycloalkanes for instance, are N-dodecyl-pyrrolidine, N-hexadecyl-pyrrolidine, N-octadecyl-pyrrolidine, N-dodecyl-piperidine, N-tetradecyl-piperidine, N-hexadecyl-piperidine, N-octadecyl-piperidine, N-octyl-azacycloheptane, N-dodecyl-azacycloheptane, N-octadecyl-azacycloheptane, N-octyl-3,3,5-trimethylazacycloheptane, N-octyl-3,5,5-trimethylazacycloheptane, N-dodecyl-3,3,5-trimethylazacycloheptane, N-dodecyl-3,5,5-trimethylazacycloheptane, N-octadecyl-3,5,5-trimethylazacycloheptane, N-octyl-azacyclononane, N-dodecyl-azacyclononane, N-octadecyl-azacyclononane, N-hexyl-azacyclotridecane, N-octyl-azacyclotridecane, N-dodecyl-azacyclotridecane and N-octadecyl-azacyclotridecane.

It is possible that other amines, not defined above, are applicable in combination with the selected organic solvents in the processes of the present invention. Therefore the amines cited should be viewed as typical but neither as optimal or restrictive.

Within the scope of the present invention, a non-polar solvent is defined as an organic solvent having a dipole moment equal to zero or only slightly larger than zero (a maximum of 0.7 debyes) as disclosed in the literature or on the basis of measurement by a method of the literature (Landolt-Boernstein, PHYSIKALISCH-CHEMISCHE TABELLEN, 5th ed., 2nd suppl. Vol. (1931), pp. 74–6).

Suitable non-polar solvents are selected from the group of aromatic, araliphatic and aliphatic hydrocarbons generally having a boiling point exceeding 140° C., preferably about 170° C., for example: cymols, 1,2,3-trimethylbenzene, 1,2,4-trimethylbenzene, diethylbenzene, 1,2,4-triethylbenzene, 1,3,5-triethylbenzene, 1,2,3,4-tetramethylbenzene, 1,2,3,5-tetramethylbenzene, 5-tert.-butyl-m-xylol, 3-phenylpentane, dodecylbenzene, decane, undecane, dodecane, tetradecane, Decalin and Tetralin, where dodecane is especially preferred.

In a preferred embodiment of the process of the present invention, a polar organic solvent is used in process stage 1 in addition to the non-polar or extensively non-polar solvent. All polar organic solvents having a boiling point between 140° and 300° C., preferably between 200° and 260° C., are suitable, which under the pertinent conditions of reaction are inert or widely inert with respect to water, hydrogen chloride, amines and thermal stresses. Particularly suitable are: ethers, non-condensing ketones and benzene derivatives such as o- and m-dichlorobenzene and nitrobenzene. Typical are for instance diphenyl ketone, o-dichlorobenzene and diphenylether. Diphenylether is especially preferred.

The weight ratio between the non-polar and the polar organic solvent can range between 99/1 and 1/99. As a rule, however, the ratio is between 9/1 and 1/9, preferably between ⅔ and 3/2.

To achieve optimal conversions in process stage 1, appropriately the sodium chloride solution is used in the most saturated form possible and an appreciable decrease in concentration is prevented as much as possible during the reaction. The weight ratio of the organic phase(s) used, consisting of amine, non-polar and possibly polar organic solvents to the aqueous sodium chloride solution on the one hand is restricted by the drop in yield due to the decrease in sodium chloride concentration by the reaction, and on the other hand to the discharge of amine through the brine, which is present even if minute. The decrease in sodium chloride by the reaction can be prevented by adding for instance solid sodium chloride to the reaction vessel or by a large excess of brine, whereas the loss in amine is prevented by circulating the brine through a NaCl saturator. As a rule the weight ratio of the organic phase(s) to the brine is from 1/9 to 9/1, preferably ½ to 2/1.

The weight ratio of the non-polar organic solvent, or of the non-polar and polar solvent mixture to the amine is varied in the present process from about 20/1 to 0.2/1, preferably from 5/1 to 0.5/1. By means of a few trials, one skilled in the art can easily ascertain which solvent/amine ratio is best suited to each particular case. It is appropriate for instance to set a given concentration in solvent(s) in order to avert excessive thermal stresses on the amine in process stage 4. The same goal also is achieved by hydrochloride dissociation in vacuum, the amounts of solvents in the sump of the dissociation column being rather small (less than 20%) if desired.

As a rule the implementation of the process of the present invention is such that the mixture, which essentially contains an aqueous sodium chloride solution, an amine, a non-polar organic solvent and possibly a polar solvent, is exposed for a given time to pressurized carbon dioxide. As a rule $CO_2$ pressures of about 5 to 40 bars are used, preferably 15 to 30 bars. It is not necessary that the selected pressure be provided only by the carbon dioxide, rather the carbon dioxide may also be fed together with inert gases such as nitrogen or argon to the carbonization stage.

Suitable pressures in stage 1 range between >5 and 80 bars. The type and the amount of the individual ingredients in process stage 1 are determined in one or more trials beforehand. While the carbon dioxide is being introduced, and possibly also some time thereafter, attention must be paid that there is good mutual mixing of the individual phases, for instance by means of a stirrer or a strong gas jet. To improve the yield, it is appropriate to operate at temperatures less than 25° C. in the carbonization stage, the lower temperature limit being determined by the dew point of the carbon dioxide, and by the crystallization of solvent, amine or aminohydrochloride. A suitable temperature range is 2° to 18° C.

Phase separation then takes place in process stage 2. It is found advantageous to carry out the separation of the organic phase from the aqueous and the solid phase at the same pressure, preferably $CO_2$ pressure, as it was set in process stage 1.

Depending on the type and amount of the organic ingredients, there may also be two organic phases. It is then a matter of economy whether the phases are further processed together or only the HCl-rich phase is processed, while the other phase is fed back into process stage 1.

As a rule phase separation is carried out so that the reaction mixture from process stage 1 is moved into a separating vessel. After the phases are separated, the organic phases are removed under pressure and decompressed, and the inorganic phases (brine and hydrogen carbonate) are removed and decompressed.

While the evacuated carbon dioxide is directly fed back into process stage 1, the feedback of the aqueous phase rid of the solid sodium bicarbonate by means of separation processes such as filtering or centrifuging is preferably implemented only after being concentrated with sodium chloride (process stage 3). The initially still moist sodium bicarbonate also is rid possibly following certain purification operations either by a non-damaging drying step, or is calcined, where the water together with the split off carbon dioxide is removed and as a rule is fed to the carbonization stage.

It is possible to eliminate as far as possible any water still present in the organic phase(s) for instance by distillation or rectification before entering the actual thermolysis operation (process stage 4). Elimination of the water, however, is only required when exclusively gaseous hydrogen chloride is desired from the subsequent dissociation of the aminohydrochloride.

In process stage 4, finally, the possibly water-free organic phase is heated to split off the hydrogen chloride from the aminohydrochloride. When carrying out the thermal dissociation of the aminohydrochloride, the reflux procedure used in U.S. Pat. No. 4,115,530 or the method disclosed in U.S. Pat. No. 4,230,681 may be used.

In the process of U.S. Pat. No. 4,115,530, the aminohydrochloride solution, which may still contain free amine, is boiled in a vessel provided with a column, the solvent or the mixture of solvents have boiling points lower by 20° C. or more than the boiling point of the amine. The vapors consisting mostly of the solvent(s) are condensed at the top of the column in conventional manner and are fed back as reflux to the column while the hydrogen chloride contained in the vapors and not dissolved by the condensed solvent simultaneously escapes from the condensation zone.

A preferred embodiment of the process of the present invention consists in using a larger amount of solvent in the dissociation column than when carbonizing in order to minimize as much as possible the thermal stresses on the amine.

In the process of U.S. Pat. No. 4,230,681, the hydrogen chloride is extracted from the aminohydrochloride by heating the aminohydrochloride in the organic solvent or mixture of solvents to 100° to 250° C. while a flow of inert gas is made to pass through. The temperature which is optimally advantageous within this range is determined by the kind and amount of amine and also by the solvent or mixture of solvents. Advantageously the solvent or mixture of solvents is of a low vapor pressure at the temperature of dissociation, that is, its boiling point is at least 20° C. above the temperature of dissociation in order to minimize as much as possible the discharge in the form of vapor in the inert gas flow.

The hydrogen chloride is easily prepared from the mixture of inert gas and hydrogen chloride in pure manner, for instance by adsorption, however, this is not required in all cases, depending on the application of the hydrogen chloride. If for instance ethylene is used as the carrier gas, then the gas mixture obtained is used directly for synthesizing chloroethanes.

A preferred embodiment of the process of the present invention finally consists in removing small amounts of impurities, for instance primary and secondary amines which are predominantly generated by the thermal stresses on the tertiary amine during thermolysis, from the sump of process stage 4 before the tertiary amine is reintroduced at a suitable location in the process.

The separation of the undesired impurities can be implemented for instance as disclosed in U.S. Pat. Nos. 4,259,309 and 4,272,502. In the case of U.S. Pat. No. 4,259,309 the mixture consisting of an amine, solvent and possibly impurities is made to pass in part or in whole over an adsorbent such as aluminum oxide, silica gel or silanized silica gel. In the process of U.S. Pat. No. 4,272,502, on the other hand, the primary and secondary amines formed are inactivated by being reacted with carboxylic acid chlorides.

The process of the present invention can be carried out both in a continuous and a discontinuous manner.

The sodium bicarbonate obtained in the process of the present invention is used most of all to make sodium carbonate, and the hydrogen chloride also obtained thereby is used to make hydrochloric acid or chlorinated hydrocarbons, for instance vinylchloride.

The process of the present invention also can be used for making potassium bicarbonate and hydrogen chloride from potassium chloride and carbonic acid.

All percentages, including the specific examples below which illustrate the process of the present invention, are by weight, unless otherwise indicated.

EXAMPLE 1

30 g of dodecane, 18 g of tri-n-octylamine corresponding to 38% by weight of amine in the added organic phase and 35 g of a saturated sodium chloride solution in addition to 7 g of solid NaCl are cooled by jacket cooling to 2° in a 300 ml autoclave with turbine stirrer and are pressurized at 30 bars of $CO_2$ for 20 minutes with stirring at 800 rpm. The stirrer is then shut off, the autoclave is decompressed, the entire content is poured into a separating funnel and after the phases are separated, the content in hydrogen chloride is determined by acidimetric titration of an aliquot part of the upper, organic phase. A conversion of 57% is obtained regarding the total amount of the amine used, by computing moles of HCl per mole of amine.

EXAMPLE 2

Carrying out the example in the same manner as for Example 1, but using each time a 30 g mixture of the stated parts of dodecane as non-polar and diphenylether as polar solvents, the conversions listed in the Table below are obtained as a function of the mixing ratios, the advantageous effect of the ether being clearly noticeable. % by weight

| diphenylether | dodecane | conversion % |
| --- | --- | --- |
| 0 | 1 | 57 |
| 1 | 4 | 65 |
| 1 | 1 | 78 |
| 4 | 1 | 89 |

EXAMPLE 3

The effect of the NaCl concentration of the aqueous phase is made clear below. The Example is carried out as in Example 1 with a ratio of diphenylether to dodecane of 1 to 1 and a conversion of 58% is obtained when only a 20% sodium chloride solution is used.

EXAMPLE 4

The effect of various $CO_2$ pressures with the use of varius NaCl concentrations of the aqueous phase is made clear below. The Example is carried out as in Example 1, a mixture of diphenylether to dodecane in a ratio of one to one and containing 34% by weight of tri-n-octylamine is used, with the following conversions:

| Sodium Chloride Solution | $CO_2$ Pressure [Bars, abs.] | Conversion % |
| --- | --- | --- |
| 25% by weight | 10 | 25 |
| 25% by weight | 30 | 70 |
| saturated + solid phase | 10 | 26 |
| saturated + solid phase | 30 | 76 |

EXAMPLE 5

This Example describes the phase separation while retaining the $CO_2$ pressure in reaction stage 1.

A pressure vessel containing about 350 ml in operation and comprising a feed neck for the liquid phases, feed necks for $CO_2$ and discharge necks for all phases is operated as a continuous stirring vessel. Per hour, 500 ml of an aqueous sodium chloride solution, 500 ml of a mixture of 34% by weight of tri-n-octylamine, 33% by weight of diphenylether and 33% by weight of dodecane are mixed and made to react with $CO_2$ at 30 bars. The phases flow through an overflow into a separation vessel at the same $CO_2$ pressure. The organic phase is removed from the upper pipe neck of the separation vessel and the aqueous phase together with the solid hydrogen carbonate is removed from the lower pipe neck.

When a 25% sodium chloride solution is used and the temperature of reaction is 2° C., a conversion of 69% is obtained for an average dwell time of 20 minutes of the organic phase in the stirring vessel after stationary operational conditions have set in.

EXAMPLE 6

This Example describes the separation of the hydrogen chloride bound in the organic phase.

The organic phase from process stage 2 is filled into a heatable flask provided with a thermometer and a descending condenser, also a pipe neck. The condensate obtained and the non-condensing parts are fed into a receiver containing an aqueous sodium carbonate liquor of known NaOH content, where stirring takes place. Behind the condenser, nitrogen is supplied through a feed neck at 4 l/h to prevent liquid back-up from the receiver. By means of a feed neck, the flask receives continuously enough solvent from a metering pump to keep the level constant.

195 g of the organic phase from Example 5 are used. After the boiling point is reached, a small amount of water/solvent-azeotrope is converted. Only then is hydrogen chloride split off in large amounts. The rate of evaporation is about 7.3 ml of distillate per minute. After 73 ml of distillate are obtained, 11% of the hydrogen chloride has been converted, and after 146 ml are obtained, 18%, and after 292 ml, 27%.

EXAMPLE 7

This Example describes the continuous production of sodium bicarbonate and hydrogen chloride.

The equipment described in Example 5 is used to carry out the carbonization reaction. The organic phase is decompressed into a buffer vessel and is continuously fed to a packed column provided with a dephlegmator 2,500 mm high, 40 mm in diameter to ¾ of its height at a rate of 850 ml/h. The entrained water is removed at the head of the column by means of a separation bottle from the condensate as aqueous hydrochloric acid. (The separation of the water without HCl loss may also carried out in a previous distillation stage). The hydrogen chloride passing through the dephlegmator is metered for balancing. The mixture of amine/solvent leaving the sump of the column is made to pass through a solid bed of 7,000 g of aluminum oxide (1,000 mm, $\phi$ 100 mm) back to the carbonization reaction. The organic phase used is a mixture of 1,615 g of tri-n-octylamine; 3,704 g of diphenylether and 3,730 g of dodecane. The aqueous phase used is a sodium chloride solution containing 25% by weight of NaCl. The carbonization reaction is carried out at about 5° C. and 30 bars of $CO_2$ pressure.

Within an operational time of 441 hours, 4.2 kg of hydrogen chloride and 10.3 kg of sodium hydrogen carbonate with a purity of 95.9% are obtained.

EXAMPLE 8

22 g of N-octyl-3,3,5-trimethylazacycloheptane (in the form of an isomeric mixture with N-octyl-3,5,5-trimethylazacycloheptane), 22 g of dodecane and 45 g of an aqueous 25% by weight NaCl solution are cooled by jacket cooling in a 300 ml autoclave equipped with a turbine agitator, and are made to react at this temperature for 60 minutes with $CO_2$ at 30 bars at a stirrer angular speed of 800 rpm. Thereupon the agitator is shut off, the autoclave is decompressed, the total contents are poured into a separating funnel and after the separation of the phases, the hydrogen chloride in the organic phase(s) is then determined by acidimetric titration. Concerning the total amount of the amine used, a conversion of 74% is obtained calculated in moles of HCl per mole of amine.

EXAMPLE 9

When in Example 8 the dodecane is replaced by a mixture of 11 g of dodecane and 11 g of diphenylether, a conversion of 91% is obtained.

EXAMPLE 10

Operating as in Example 8, and using a mixture of 22.5 g of N-dodecyl-piperidine, 11 g of dodecane, 11 g of diphenylether and 45 g of an aqueous 25% by weight NaCl solution, a conversion of 85% is obtained.

EXAMPLE 11

This example describes the isolation of the hydrogen chloride bound in the organic phase. As a rule, the procedure is such that the organic phase(s) from the process stage 2 is (are) filled into a heatable flask equipped with a thermometer and a descending condenser as well as with a connecting neck. The condensate being collected and the non-condensing parts are fed into a receiver containing an aqueous sodium carbonate liquor of known NaOH content and which is stirred. About 4 liters per hour of nitrogen is supplied through a feed neck behind the condenser to prevent the liquid from backing up from the receiver. Sufficient solution is continuously fed into the flask through the feed neck by means of a metering pump to ensure that the level remains constant.

180 g of the organic phase per Example 8 are used. After reaching the boiling point, initially a small amount of water-solvent azeotrope is transferred. Only then is hydrogen chloride split off in large amounts. The rate of evaporation is about 8 ml of distilled product per minute. After obtaining 40 ml of distilled product, 10% of the hydrogen chloride has been transferred, and after 130 ml, 18.5%.

We claim:

1. In a method for producing sodium bicarbonate and hydrogen chloride by reacting an aqueous sodium chloride solution with carbon dioxide in the presence of an amine and an organic solvent, the improvement comprising:
   (a) introducing said carbon dioxide under pressure into a mixture comprising
      (A) said aqueous sodium chloride solution,
      (B) said amine comprising a tertiary amine,
      (C) said organic solvent comprising at least one polar, organic solvent having a boiling point above 140° C.;
      (D) said organic solvent comprising at least one non-polar, organic solvent,
   to produce an aqueous phase and at least one organic phase;
   (b) separating said aqueous phase and said organic phase under the same pressure as step (a);
   (c) separating said sodium bicarbonate from said aqueous phase, reconcentrating said separated aqueous phase with sodium chloride and feeding back said reconcentrated aqueous phase into step (a);
   (d) separating said hydrogen chloride from said organic phase containing said non-polar organic solvent and said polar, organic solvent by heating, and said amine; and
   (e) recirculating said amine and said polar and non-polar organic solvents to step (a).

2. The method of claim 1, wherein said tertiary amine is a non-aromatic amine having 14 to 39 C atoms in the nitrogen-bound, ligends, where all side chains may be unbranched and primary but including at most one methyl group or where the unbranched primary side chains are replaced in whole or in part by branched primary side chains provided that the branch point is at least 3 C atoms away from the central nitrogen atom, or where two of the side chains are branched and primary with the branching in the 2-position and the third side chain is unbranched and primary, or where one side chain is branched and primary with the branching in the 2-position while the other side chains either are both unbranched and primary or only one is unbranched and primary and the other is unbranched and secondary or aliphatic, or where two of the unbranched and primary side chains are replaced by cyclohexyl groups and on the other hand by mixtures of other tertiary non-aromatic amines having 14 to 39 C atoms in which the above defined amines are present in excess by weight.

3. The method of claim 2 wherein said tertiary amine is selected from the group consisting of trihexylamine, trioctylamine, trilaurylamine, tri-(3,5,5-trimethylhexyl)-amine, tri-(3,5,5-trimethyloctyl)-amine, tri-(3,5,5-trimethyldecyl)-amine, N-octyl-di-(2-ethylhexyl)-amine, N,N-dioctyl-(2-ethylhexyl)-amine, N-octyl-N-(2-ethylhexyl)-cyclohexylamine, N-octyldicyclohexylamine and N-hexadecyldicyclohexylamine.

4. The method of claim 2, wherein step (d) is carried out at a temperature of about 100° to 250° C.

5. The method of claim 4, wherein said polar, organic solvent has a boiling point between 140° and 300° C.

6. The method of claim 5, wherein said polar, organic solvent has a boiling point between 200° to 260° C.

7. The method of claim 6, wherein said polar, organic solvent is selected from the group consisting of diphenyl ketone, dichlorobenzene, diphenylether and nitrobenzene.

8. The process of claim 1, wherein the same pressure is applied in process stage (b) as in process stage (a).

9. The process of claim 8, wherein different amounts of solvents are used within process stage (d).

10. The method of claim 8, wherein said pressure is about 5 to 80 bars.

11. The method of claim 10, wherein step (a) is carried out at a temperature of about 2° to 18° C.

12. The method of claim 11, wherein said pressure is 30 bars.

13. The process of claim 1, having a plurality of organic phases, wherein only that phase with the highest aminohydrochloride concentration is fed to process stage (d).

14. The process of claim 1, wherein decay products accumulating in a sump of process stage (d) are removed.

15. The process of claim 1, wherein decay products accumulating in a sump of process stage (d) are inactivated therein and these inactivated products are recycled into process stage (a).

16. The process of claim 1, wherein the weight ratio of C to B in process step (a) is about 20/1 to 0.2/1.

17. The process of claim 16, wherein the weight ratio of C+B to A in process step (a) is about 1/9 to 9/1.

18. The process of claim 17, wherein the carbon dioxide pressure is about 5 to 40 bars.

* * * * *